United States Patent [19]

Gleim et al.

[11] Patent Number: 5,146,444
[45] Date of Patent: Sep. 8, 1992

[54] SERVO CONTROL LOOP

[75] Inventors: Günter Gleim, Villingen; Friedrich Füldner, Villingen-Schwenningen; Bernd Rekla, Villingen, all of Fed. Rep. of Germany

[73] Assignee: Deutsche Thomson-Brandt GmbH, Hanover, Fed. Rep. of Germany

[21] Appl. No.: 703,899

[22] Filed: May 22, 1991

[30] Foreign Application Priority Data

May 31, 1990 [DE] Fed. Rep. of Germany ....... 4017487

[51] Int. Cl.$^5$ ............................................. G11B 7/085
[52] U.S. Cl. ................................ 369/44.41; 369/44.11
[58] Field of Search ............... 369/44.41, 44.42, 44.11, 369/44.12, 58, 54, 44.23, 44.32; 358/338, 342

[56] References Cited

U.S. PATENT DOCUMENTS

| 4,603,410 | 7/1986 | Yoshida | 369/44.41 |
| 4,617,654 | 10/1986 | Gross et al. | 369/44.41 |
| 4,736,354 | 4/1988 | Yoshio | 369/44.41 |
| 4,794,244 | 12/1988 | Kimura | 369/44.11 |
| 4,896,309 | 1/1990 | Yamakawa et al. | 369/44.41 |
| 4,956,833 | 9/1990 | Kokado et al. | 369/54 |
| 5,022,021 | 6/1991 | Ito | 369/44.11 |
| 5,049,733 | 9/1991 | Yoshifusa et al. | 369/44.41 |

FOREIGN PATENT DOCUMENTS

| 0068247 | 4/1983 | Japan | 369/44.11 |
| 0152547 | 8/1984 | Japan | 369/44.32 |
| 0012933 | 1/1987 | Japan | 369/44.11 |
| 0269237 | 10/1989 | Japan | 369/44.11 |
| 0033733 | 2/1990 | Japan | 369/44.11 |

Primary Examiner—Roy N. Envall, Jr.
Assistant Examiner—Hung Dang
Attorney, Agent, or Firm—Max Fogiel

[57] ABSTRACT

A servo control arrangement for an optical scanner for focusing a light beam onto a recording medium or for guiding the light beam along data tracks of the recording medium. Light reflected from the recording medium is directed onto a plurality of photodiodes which are connected to a differential amplifier. The amplifier takes differences of the output signals from the photodiodes to generate a servo signal having superimposed high frequency noise components from data recorded on the recording medium. The high frequency noise components are eliminated by short circuiting through a capacitor connected between the inputs of the differential amplifier, whereby the inputs of the differential amplifier become free of the high frequency noise components.

6 Claims, 3 Drawing Sheets 100 5,146,444

SERVO CONTROL LOOP

BACKGROUND OF THE INVENTION

The invention concerns a servo regulation circuit (servo control loop) for an optical scanning means for focusing a light beam onto a recording medium or for guiding the light beam along the data tracks of the recording medium, which reflects the light beam onto several photodiodes; a servo signal is generated from the output signals of these (photodiodes) through subtraction (formation of differences) and this is overlaid by a high frequency oscillation due to the data recorded on the recording medium.

A CD player is equipped with, for example, two servo control loops, one focus regulation circuit and one track regulation circuit. In a CD player, which scans the recording medium, the compact disk, according to the so-called three-beam technique, the light beam of a laser is directed onto the disk by means of lenses and a prism beam splitter. An optical grating is located in the beam path so that the light beam generated by the laser is divided into the main beam and the diffracted beams.

The main beam is reflected from the disk onto a four quadrant photo detector with four photodiodes A, B, C and D, while the positive first order diffracted beam is reflected onto a photodiode E and the negative first order diffracted beam is reflected onto a photodiode F. The focusing error signal $FE=(AS+BS)-(DS+CS)$ for the focus regulation circuit is formed from the output signals AS, BS, CS and DS of photodiodes A, B, C and D of the four quadrant photo detector. The track error signal $TE=ES-FS$ for the track regulation circuit is generated from the output signals ES and FS of photodiodes E and F. Due to the data recorded on the disk, not only the focusing error signal but also the track error signal is overlaid by undesired high frequency components which aggravate the focus and track regulation.

SUMMARY OF THE INVENTION

Therefore, it is the object of the invention to form a servo control loop in such a way that high frequency overlays in the servo signal no longer have a disturbing effect on the regulation.

The invention solves this task in that the high frequency oscillations are short-circuited before the subtraction (formation of differences) by means of a capacitor.

BRIEF DESCRIPTION OF THE DRAWINGS

The drawings show in

DESCRIPTION OF THE PREFERRED EMBODIMENTS

Figure 1:
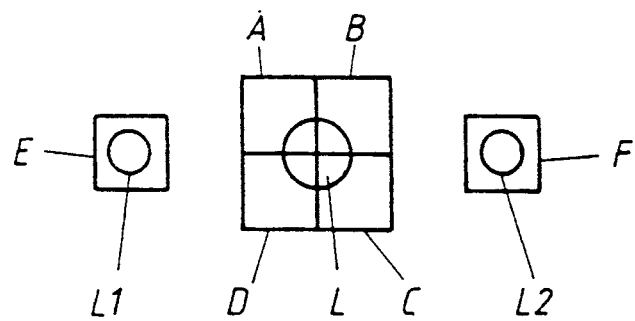
FIG. 1 an arrangement consisting of a four quadrant photo detector and the photodiodes of a track regulation circuit, FIG. 2 a circuit arrangement for generating the focusing error signal, FIG. 3 a circuit arrangement for generating the focusing error signal according to another embodiment, FIG. 4 a circuit arrangement for generating the track error signal, FIG. 5 a circuit arrangement for generating the track error signal according to another embodiment, FIG. 6 the state-of-the-art focusing error signal, FIG. 7 the state-of-the-art track error signal.

FIG. 1 shows the customary arrangement in CD players of the four quadrant photo detector onto which the main beam L is reflected from the disk, the photodiode E onto which the positive first order diffracted beam L1 is reflected, and the photodiode F onto which the negative first order diffracted beam L2 is reflected. The four quadrant photo detector and the photodiodes E and F are mounted on a common support.

Figure 2:
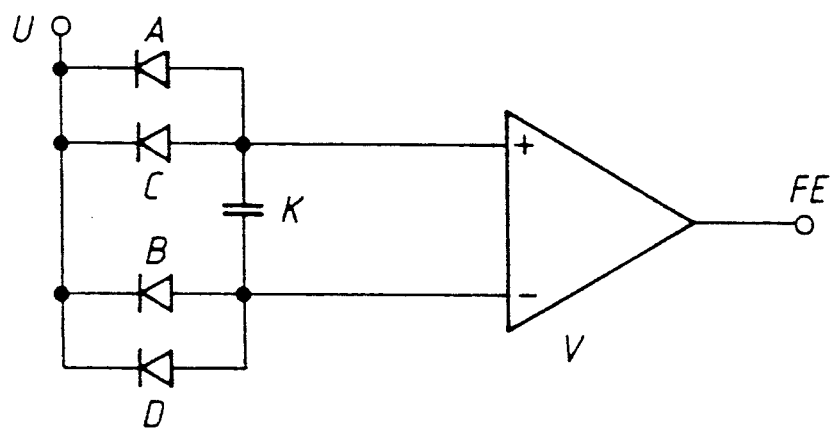

The circuit arrangement shown in FIG. 2 illustrates, as an example, how the focusing error signal FE is generated for a focus regulation circuit.

Figure 6:
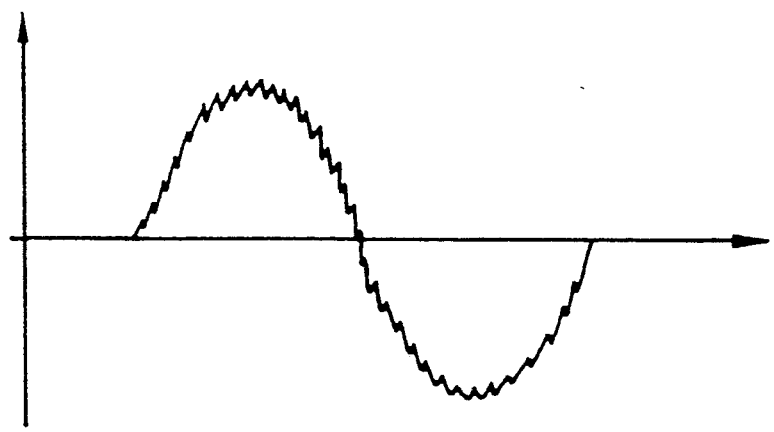

The state-of-the-art focusing error signal is illustrated in FIG. 6. It has a sine wave response and is superimposed by a high frequency oscillation which aggravates the focus regulation.

In the focus regulation circuit according to the invention shown in FIG. 2, the first interconnected electrodes of the four photodiodes A, B, C and D are connected to a voltage U. The other electrodes of the photodiodes A, C are connected with the first input of a differential amplifier V, while the other electrodes of the photodiodes B and D are connected with the other input of the differential amplifier V. A capacitor K is provided between the two inputs of the differential amplifier V which short-circuits the high frequency overlays in the output signals of the photodiodes A, B, C and D. Therefore, the focusing error signal FE no longer contains high frequency overlays which disturb and aggravate the regulation.

Figure 3:
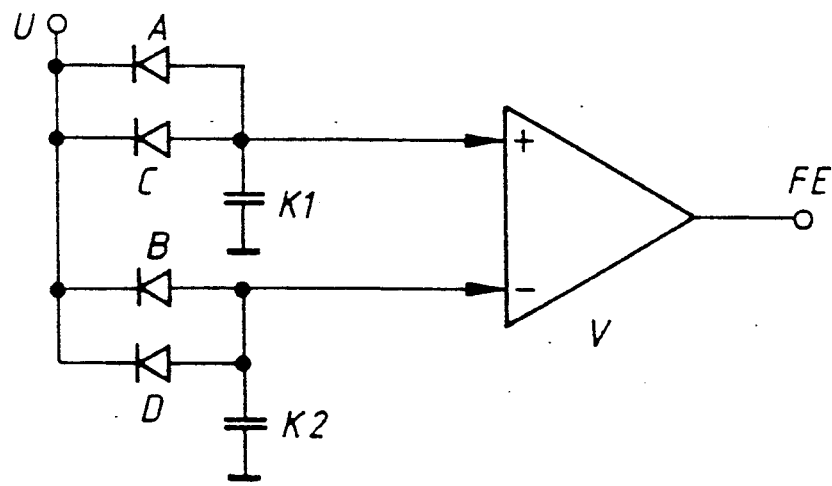

In the focus regulation circuit illustrated in FIG. 3, the anodes of the diodes A, B, C and D are each connected to ground via a capacitor K1 and K2. The capacitor K between the inputs of the differential amplifier V is therefore no longer necessary.

Figure 7:
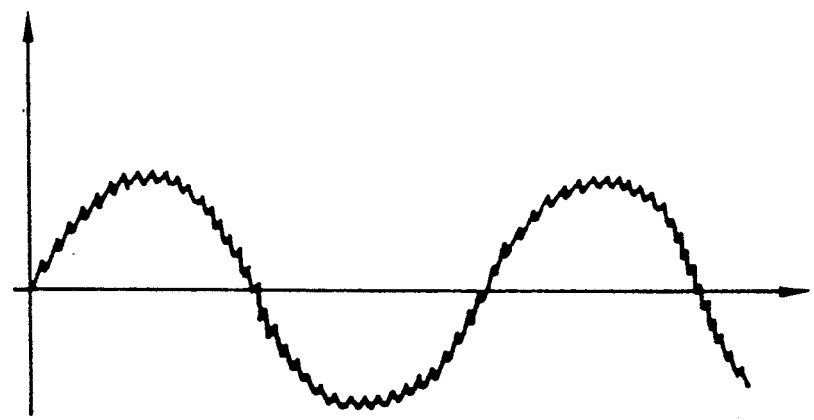

The state-of-the-art sine wave track error signal TE is shown in FIG. 7 which, like the focusing error signal, is superimposed by high frequency oscillations.

Figure 4:
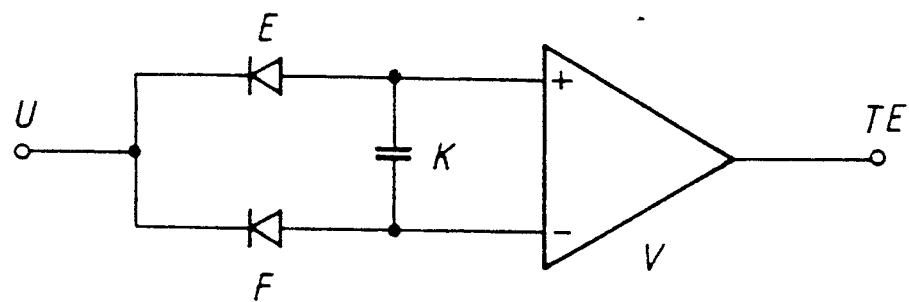

The circuit arrangement represented in FIG. 4 is used to illustrate how the focusing error signal TE is generated.

A voltage U is applied to the first electrodes of the photodiodes E and F, while a capacitor K is provided between the other electrodes which are connected to the inputs of a differential amplifier V. As the capacitor K, like in the arrangement shown in FIG. 2, short-circuits the high frequency components in the output signals of the photodiodes, the track error signal TE no longer contains high frequency overlays which aggravate track regulation with the present state-of-the-art.

Figure 5:
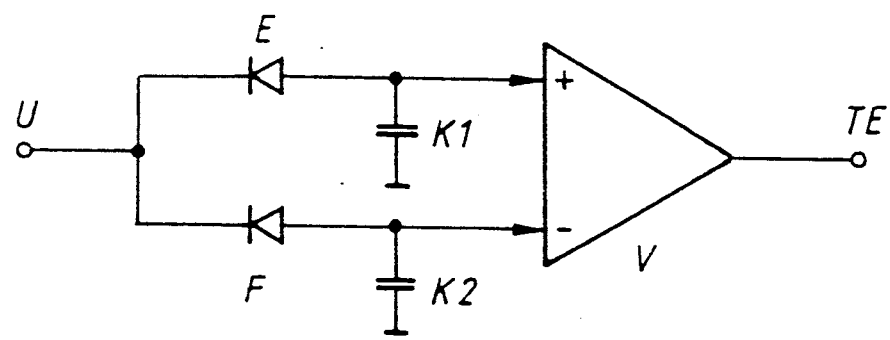

Instead of providing the capacitor K between the two photodiodes E and F, the anodes of the two photodiodes E and F for the track regulation circuit shown in FIG. 5 are connected to ground each via a capacitor K1 and K2.

The invention is suitable for optical recording and playback devices which focus a light beam onto a recording medium by means of a focus regulation circuit and guide the light beam along the data tracks of the recording medium by means of a track regulation circuit. Examples of this are CD players, video disk players, DRAW disk players and magneto-optical devices.

We claim:

1. A servo control arrangement in combination with an optical scanner for focusing a light beam onto a recording medium or for guiding the light beam along data tracks of said recording medium, comprising: a plurality of photodetectors having photodiodes receiving light reflected from said recording medium; a differential amplifier with inputs connected to said photodiodes for taking differences of output signals from said photodiodes to generate a servo signal having superimposed high frequency oscillation components from data recorded on said recording medium, said high frequency oscillation components being noise components on said output signals from said photodiodes; and capacitor means connected between said inputs of said differential amplifier for eliminating by short-circuiting said noise components on said output signals from said photodiodes, so that said inputs of said differential amplifier are free of said high frequency oscillation components.

2. A servo control arrangement for focus regulation as defined in claim 1, wherein said plurality of photodetectors comprise a four quadrant photodetector with four photodiodes having first electrodes connected together; a source of voltage connected to said first electrodes of said four photodiodes; said four photodiodes having a first pair of photodiodes with second electrodes connected together at a first junction, and a second pair of photodiodes with second electrodes connected together at a second junction; said capacitor means being connected between said first junction and said second junction.

3. A servo control arrangement for track regulation as defined in claim 1, wherein said reflected light comprises a positive first order diffracted beam reflected from said recording medium onto a first photodiode, and a negative first order diffracted beam reflected from said recording medium onto a second photodiode; said first and second photodiodes having first electrodes connected together at a first junction; a source of voltage connected to said first junction, said photodiodes having second electrodes connected to said inputs of said differential amplifier, and capacitor means connected between said second electrodes.

4. A servo control arrangement in combination with an optical scanner for focusing a light beam onto a recording medium or for guiding the light beam along data tracks of said recording medium, comprising: a plurality of photodetectors having photodiodes receiving light reflected from said recording medium; a differential amplifier with inputs connected to said photodiodes for taking differences of output signals from said photodiodes to generate a servo signal having superimposed high frequency oscillation components from data recorded on said recording medium, said high frequency oscillation components being noise components on said output signals from said photodiodes; first capacitor means connected between one input of said differential amplifier and ground potential; and second capacitor means connected between another input of said differential amplifier and ground potential.

5. A servo control arrangement as defined in claim 4, wherein said plurality of photodetectors comprise a four quadrant photodetector with four photodiodes having first electrodes connected together; a source of voltage connected to said first electrodes of said four photodiodes; said four photodiodes having a first pair of photodiodes with second electrodes connected together at a first junction, and a second pair of photodiodes with second electrodes connected together at a second junction; said first capacitor means being connected between said first junction and ground potential, and said second capacitor means being connected between said second junction and ground potential.

6. A servo control arrangement for track regulation as defined in claim 4, wherein said reflected light comprises a positive first order diffracted beam reflected from said recording medium onto a first photodiode and a negative first order diffracted beam reflected from said recording medium onto a second photodiode, said first and second photodiodes having first electrodes connected together at a first junction; a source of voltage connected to said first junction, said photodiodes having second electrodes connected to said inputs of said differential amplifier; said first capacitor means being connected between ground potential and the second electrode of said first photodiode, and said second capacitor means being connected between ground potential and the second electrode of said second photodiode.

* * * * *